United States Patent
Nishizawa (10) Patent No.: US 8,934,069 B2
(45) Date of Patent: Jan. 13, 2015

(54) LIQUID CRYSTAL DISPLAY DEVICE

(75) Inventor: Shigeki Nishizawa, Mobara (JP)

(73) Assignees: Japan Display Inc., Tokyo (JP); Panasonic Liquid Crystal Display Co., Ltd., Himeji-shi (JP)

( * ) Notice: Subject to any disclaimer, the term of this patent is extended or adjusted under 35 U.S.C. 154(b) by 519 days.

(21) Appl. No.: 13/086,431

(22) Filed: Apr. 14, 2011

(65) Prior Publication Data

US 2011/0255028 A1 Oct. 20, 2011

(30) Foreign Application Priority Data

Apr. 16, 2010 (JP) ................................. 2010-095109

(51) Int. Cl.
G02F 1/1335 (2006.01)
G02F 1/1362 (2006.01)
G02F 1/1343 (2006.01)

(52) U.S. Cl.
CPC .... G02F 1/136209 (2013.01); G02F 1/133553 (2013.01); G02F 1/134363 (2013.01)
USPC .............................................. 349/62; 349/96

(58) Field of Classification Search
USPC ................... 349/61–65, 96, 110, 111
See application file for complete search history.

(56) References Cited

U.S. PATENT DOCUMENTS

| | | | | |
|---|---|---|---|---|
| 5,929,948 A | * | 7/1999 | Ohori et al. | 349/44 |
| 6,133,970 A | * | 10/2000 | Hirakata et al. | 349/75 |
| 6,160,598 A | * | 12/2000 | Lyu | 349/111 |
| 6,532,045 B2 | * | 3/2003 | Chung et al. | 349/43 |
| 2006/0098140 A1 | * | 5/2006 | Lee | 349/98 |
| 2014/0055715 A1 | * | 2/2014 | Lee et al. | 349/62 |
| 2014/0098330 A1 | * | 4/2014 | Nam et al. | 349/96 |
| 2014/0118656 A1 | * | 5/2014 | Jang et al. | 349/44 |

FOREIGN PATENT DOCUMENTS

JP 05-150231 6/1993

OTHER PUBLICATIONS

Birendra Bahadur, Liquid Crystals Applications and Uses, 1990, World Scientific, vol. 1, pp. 171-194.*

* cited by examiner

Primary Examiner — Edward Glick
Assistant Examiner — David Chung
(74) Attorney, Agent, or Firm — Antonelli, Terry, Stout & Kraus, LLP.

(57) ABSTRACT

Provided is a liquid crystal display device which includes: a pair of transparent substrates which are arranged to face each other in an opposed manner with a liquid crystal layer sandwiched therebetween; a non-self-luminous display part having at least a light transmitting region which allows light to pass therethrough and a light shielding region which shields light; and a backlight part, wherein the transparent substrate arranged on a backlight part side includes a reflection film formed of a metal thin film in which an opening region corresponding to the light transmitting region is formed on a liquid crystal layer side of the transparent substrate on the backlight part side, and the backlight light incident on the opening region passes through the opening region, and the backlight light incident on a region where the reflection film is formed is reflected toward the backlight part side.

8 Claims, 4 Drawing Sheets

LIQUID CRYSTAL DISPLAY DEVICE

CROSS-REFERENCE TO RELATED APPLICATION

The present application claims priority from Japanese application JP 2010-095109 filed on Apr. 16, 2010, the content of which is hereby incorporated by reference into this application.

BACKGROUND OF THE INVENTION

1. Field of the Invention

The present invention relates to a liquid crystal display device, and more particularly to a liquid crystal display device which includes a backlight unit on a back surface of a non-self-luminous display part.

2. Description of the Related Art

For example, a liquid crystal display device is usually configured such that a backlight unit is mounted on a back surface of a liquid crystal display panel.

The liquid crystal display panel is constituted as a so-called non-self-luminous display panel where optical transmissivities of a plurality of pixels in a display region of the liquid crystal panel are controlled by driving liquid crystal. Due to such a constitution, a display image displayed by the liquid crystal display panel is formed of lights which are emitted from the backlight unit and pass through the respective pixels.

In the liquid crystal display panel, a display region is formed of a plurality of pixels arranged in a matrix array, and light shielding is provided between one pixel and other pixels which are arranged adjacent to one pixel in the left, right, upper and lower directions for every pixel. This light shielding is provided mainly for preventing a signal line arranged between the pixels from being observed with naked eyes, for preventing color mixing between the neighboring pixels, for preventing the deterioration of characteristics of a thin film transistor for pixel selection arranged in the vicinity of the signal line due to the irradiation of light to the thin film transistor and the like.

As the backlight unit, there has been known, for example, a backlight unit which is constituted of a light guide plate arranged to face a liquid crystal display panel in an opposed manner, a plurality of light emitting diodes arranged along a side surface of the light guide plate, and a reflection sheet arranged on a surface of the light guide plate on a side opposite to a liquid-crystal-display-panel side. The backlight unit having such a constitution functions as a flat light source since light emitted from the light emitting diodes propagates in the inside of the light guide plate, is reflected on the reflection sheet or the like and is irradiated from a surface of the light guide plate on the liquid-crystal-display-panel side.

Further, JP 5-150231 A discloses a technique where out of a pair of transparent substrates which forms a liquid crystal display panel, a light shielding film is formed over a polarizer mounted on an outer surface of the transparent substrate arranged on a backlight unit side, and the light shielding film is made of a material having high reflectance thus enhancing light utilization efficiency of backlight light.

SUMMARY OF THE INVENTION

In the liquid crystal display panel, as described above, a light shielding region is formed between one pixel (pixel region) and another pixel (pixel region) in the display region. Here, an area ratio that the pixel regions occupy in the display region is referred to as an opening ratio of pixel, and it is desirable to increase this opening ratio of pixel. This is because the increase of the opening ratio of pixel can enhance the brightness of a display image.

However, along with a demand for higher resolution of an image in recent years, the enhancement of an opening ratio of pixel is stopped at approximately 50%. This implies that out of light irradiated to the display region of the liquid crystal display panel, half of light which can pass through the pixel region contributes to an image display and remaining half of light is absorbed in the light shielding region so that approximately half of the light from the backlight unit is not utilized.

On the other hand, in the technique disclosed in JP 5-150231 A, the light shielding film is mounted on the polarizer formed over an outer surface of the liquid crystal display panel on an backlight side, and the light shielding film is made of a material having high reflectance and hence, extremely high alignment accuracy becomes necessary in forming the light shielding film.

The present invention has been made under such circumstances, and it is an object of the present invention to provide a liquid crystal display device which can enhance the brightness of a non-self-luminous display part by effectively making use of light from a backlight unit.

To overcome the above-mentioned drawbacks, according to an aspect of the present invention, there is provided a liquid crystal display device including: a pair of transparent substrates which are arranged to face each other in an opposed manner with a liquid crystal layer sandwiched therebetween; a non-self-luminous display part having at least a light transmitting region which allows light to pass therethrough and a light shielding region which shields light; and a backlight part which irradiates backlight light from a back surface side of the non-self-luminous display part, wherein out of the pair of transparent substrates, the transparent substrate which is arranged on a backlight part side includes a reflection film formed of a metal thin film in which an opening region corresponding to the light transmitting region is formed on a liquid crystal layer side of the transparent substrate on the backlight part side, and the backlight light which is incident on the opening region passes through the opening region and reaches the liquid crystal layer side, and the backlight light which is incident on a region where the reflection film is formed is reflected toward the backlight part side.

According to the present invention, the light utilization efficiency of backlight light can be enhanced so that light from the backlight unit can be efficiently utilized whereby the brightness of the non-self-luminous display part can be enhanced.

Other advantages of the present invention will become apparent through the description of the whole specification.

DETAILED DESCRIPTION OF THE INVENTION

Hereinafter, respective embodiments to which the present invention is applied are explained in conjunction with drawings. In the explanation made hereinafter, identical constitutional elements are given the same symbols and the repeated explanation of these parts is omitted.

Embodiment 1

[Whole Constitution]

Figure 1A:
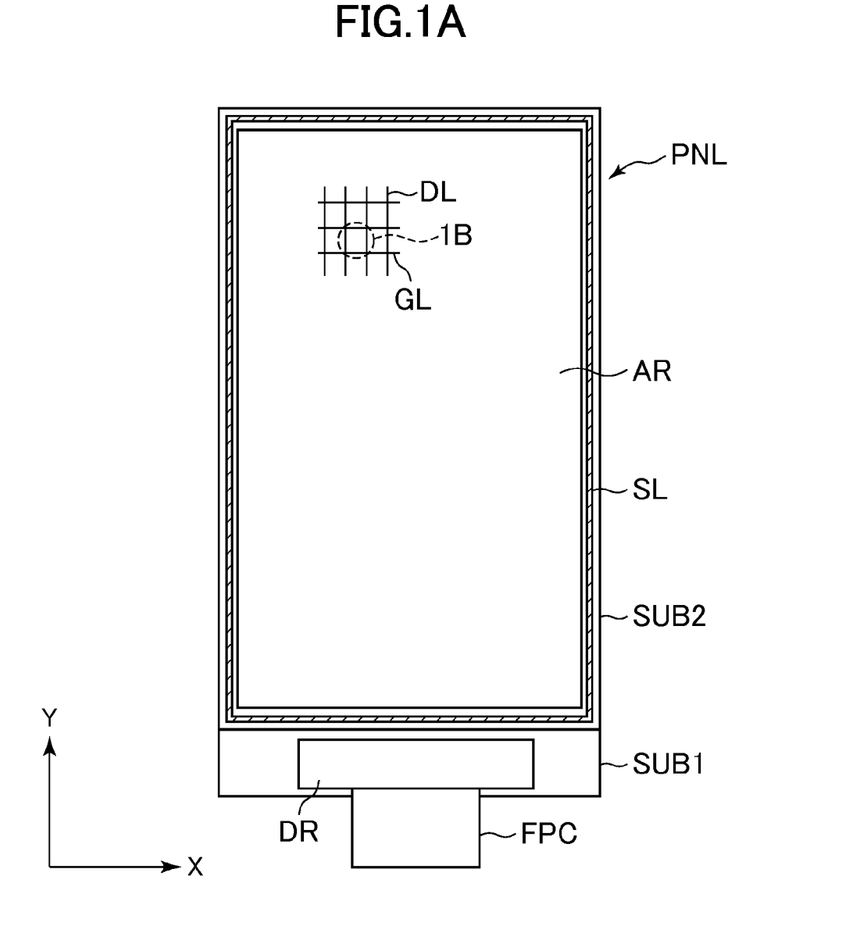
FIG. 1A is a view for explaining the whole constitution of a liquid crystal display device according to an embodiment 1 of the present invention.

FIG. 1A is view for explaining the whole constitution of a liquid crystal display device according to an embodiment 1 of the present invention. Hereinafter, the whole constitution of the liquid crystal display device according to the embodiment 1 is explained in conjunction with FIG. 1A. In FIG. 1A, symbols X, Y indicate an X axis and a Y axis respectively.

As shown in FIG. 1A, the liquid crystal display device according to the embodiment 1 includes a liquid crystal display panel PNL having a first substrate SUB1 on which pixel electrodes and the like are formed, a second substrate SUB2 which forms color filters and a black matrix thereon and is arranged to face the first substrate SUB1 in an opposed manner, and a liquid crystal layer not shown in the drawing which is sandwiched between the first substrate SUB1 and the second substrate SUB2. The liquid crystal display device according to the embodiment 1 is constituted by combining the liquid crystal display panel PNL and a backlight unit (backlight device) not shown in the drawing which constitutes a light source. Fixing of the first substrate SUB1 and the second substrate SUB2 and sealing of liquid crystal in the liquid crystal display panel are performed by annularly applying a seal member SL to a peripheral portion of the second substrate. Further, the second substrate SUB2 has an area smaller than an area of the first substrate SUB1 so that a lower side portion of the first substrate SUB1 is exposed in the drawing. A drive circuit DR which is constituted of a semiconductor chip is mounted on the side portion of the first substrate SUB1. The drive circuit DR drives the respective pixels within a display region AR described later. In the explanation made hereinafter, there may be a case that the phrase "liquid crystal display device" is also used in the explanation of the liquid crystal display panel PNL.

Further, the first substrate SUB1 and the second substrate SUB2 are formed using a well-known glass substrate as a base material, for example, in general. However, the base material of these substrates is not necessarily limited to the glass substrate, and these substrates may be formed using another insulation substrate made of quartz glass or plastic (resin). For example, with the use of quartz glass, a process temperature can be raised and hence, agate insulation film of a thin film transistor TFT described later can be densified whereby the reliability of the liquid crystal display device can be enhanced. On the other hand, with the use of the plastic (resin) substrate, it is possible to provide a liquid crystal display device which is light-weighted and exhibits excellent impact resistance.

In the liquid crystal display device of the embodiment 1, a region where a plurality of display pixels (hereinafter, abbreviated as pixels) are formed within a region in which liquid crystal is sealed constitutes the display region AR. Accordingly, even when a certain region falls within the region in which liquid crystal is sealed, if the pixel is not formed in such a region so that the region is unrelated to a display, the region does not constitute the display part AR.

Figure 1B:
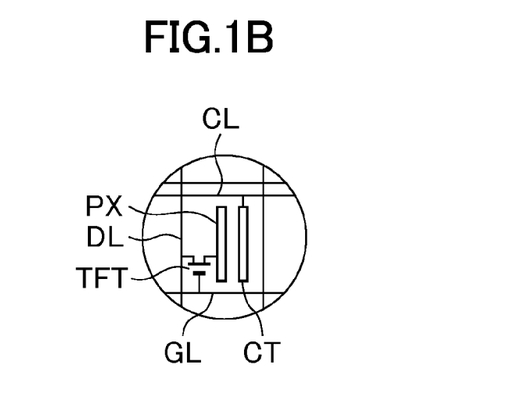
FIG. 1B is an enlarged view showing one example of each pixel in FIG. 1A.

In the liquid crystal display device of the embodiment 1, on a liquid-crystal-side surface of the first substrate SUB1 and within the display region AR, a plurality of scanning lines (gate lines) GL which extend in the X direction and are arranged parallel to each other in the Y direction in FIG. 1 are formed. Further, a plurality of video signal lines (drain lines) DL which extend in the Y direction and are arranged parallel to each other in the X direction in FIG. 1 are formed. A rectangular region surrounded by the drain lines DL and the gate lines GL constitutes a region where the pixel is formed. Accordingly, the respective pixels are arranged in a matrix array within the display region AR. FIG. 1B is a view showing one example of each pixel, and shows a region surrounded by a dotted line in FIG. 1A in an enlarged manner. Each pixel includes the thin film transistor TFT whose ON/OFF operation is driven in response to a scanning signal from the gate line GL, a pixel electrode PX to which a video signal is supplied from the drain line DL via the thin film transistor TFT when the thin film transistor TFT is turned on. Further, each pixel includes a common electrode CT connected to a common line CL and to which a common signal having a potential which becomes the reference with respect to a potential of a video signal is supplied.

An electric field having a component parallel to a main surface of the first substrate SUB1 is generated between the pixel electrode PX and the common electrode CT, and molecules of liquid crystal are driven by this electric filed. Such a liquid crystal display device is known as a display device which can perform a so-called wide viewing angle display, and is referred to as an IPS method (including IPS-Pro method) liquid crystal display device or lateral-electric-field method liquid crystal display device in view of uniqueness of applying of an electric field to liquid crystal. In the liquid crystal display device having such a constitution, display is performed in a normally black display mode in which optical transmissivity when an electric field is not applied to liquid crystal becomes minimum (black display) and optical transmissivity is enhanced due to the application of an electric field.

End portions of the respective drain lines DL and the respective gate lines GL get over the sealing material SL, extend to the outside and are connected to the drive circuit DR. In the liquid crystal display device of the embodiment 1, the drive circuit DR is formed of a semiconductor chip and is mounted on the first substrate SUB1. However, either one or both of a video signal drive circuit which outputs a video signal and a scanning signal drive circuit which outputs a scanning signal may be mounted on a flexible printed circuit board FPC by a tape carrier method or a COF (Chip On Film) method and may be connected to the first substrate SUB1.

With respect to the constitution of the common electrode CT shown in FIG. 1B which is an enlarged view, a common signal is inputted to the common electrode CT independently formed for every pixel by way of a common line CL. However, the present invention is not limited to such a constitution. The common electrodes CT of the pixels which are arranged adjacent to each other in the X direction may be formed such that these common electrodes CT may be directly connected to each other, and a common signal may be inputted to the common electrodes CT from one lateral end or both lateral ends (end portions of the first substrate SUB1) in the X direction by way of the common line CL.

[Constitution of Pixel]

Figure 2:
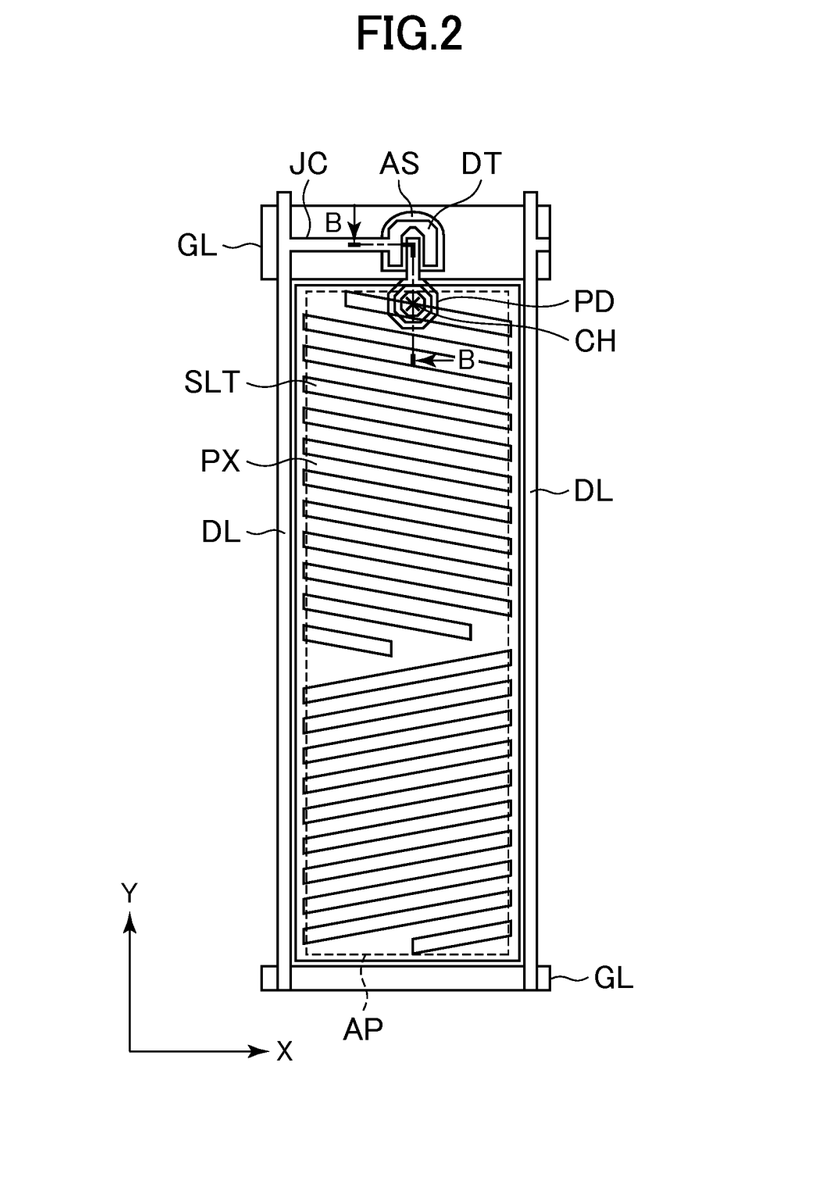
FIG. 2 is a schematic top plan view for explaining the pixel constitution in the liquid crystal display device according to the embodiment 1 of the present invention.
Figure 3:
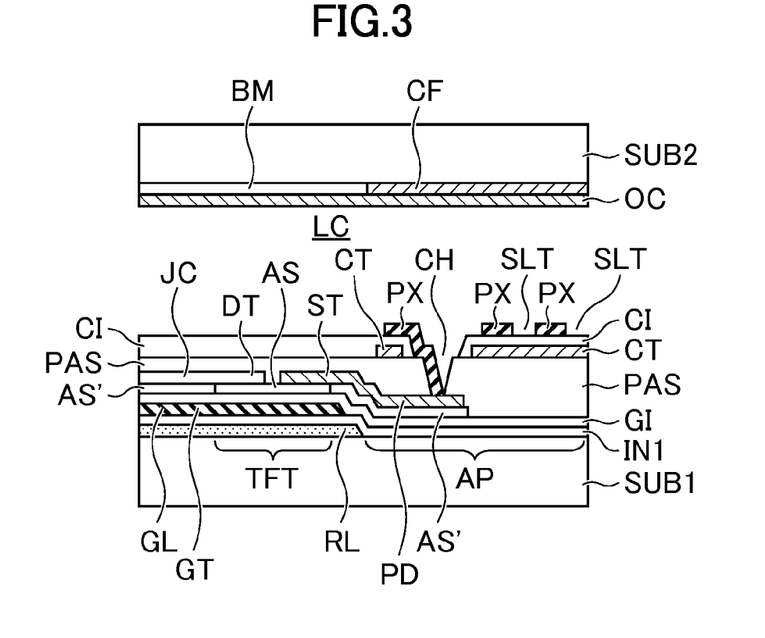
FIG. 3 is a cross-sectional view taken along a line B-B in FIG. 2.

FIG. 2 is a schematic top plan view of the liquid crystal display device of the embodiment 1 for explaining the pixel constitution, and FIG. 3 is a cross-sectional view taken along a line B-B in FIG. 2. Hereinafter, the pixel structure of the liquid crystal display device according to the embodiment 1 is explained in conjunction with FIG. 2 and FIG. 3. However, for the sake of brevity, only the first substrate is shown in FIG. 2 and a well-known alignment film is omitted. Further, the formation of a thin film including the formation of a reflection film RL can be achieved by a known photolithography technique and hence, the detail of the method for forming the thin film is omitted.

As shown in FIG. 2, in the liquid crystal display device of the embodiment 1, the region which is surrounded by the gate lines GL extending in the X direction and being arranged parallel to each other in the Y direction and the drain lines DL extending in the Y direction and being arranged parallel to each other in the X direction constitutes the region of pixel. Due to such a constitution, in the liquid crystal display device of the embodiment 1, the pixels are formed in a matrix array. Further, in the liquid crystal display device of the embodiment 1, on a liquid-crystal-side surface (counter surface) of the first substrate SUB1, for example, the planar common electrode CT made of a transparent conductive material such as ITO (Indium Tin Oxide) is formed. The common electrode CT is formed in an overlapping manner with the common line CL on a side portion of the first substrate SUB1 so that the common electrode CT is electrically connected with the common line CL. In the embodiment 1, the gate lines GL and the drain lines DL are formed of a metal thin film.

Further, as shown in FIG. 3, on a surface of the first substrate SUB1, the reflection film RL formed of a metal thin film made of Ag (silver), Al (aluminum) or the like or an alloy containing Ag or Al, for example, is formed. Here, in the region where the pixel electrode PX is formed, a region where the metal thin film is not formed, that is, an opening portion (opening region) AP which is a region where the reflection film RL is not formed is arranged. That is, in the embodiment 1, all regions except for the region related to the display of an image are formed as regions where the reflection film RL is formed, and an outermost peripheral portion of the reflection film RL surrounds further an outer periphery of the region in which backlight light is incident on the first substrate SUB1. Due to such a constitution, light utilization efficiency of backlight light from a backlight unit can be enhanced. However, the outermost peripheral portion of the reflection film RL may agree with an outline of the first substrate SUB1 or the display region AR. A metal thin film material for forming the reflection film RL may be suitably selected corresponding to a semiconductor material used for forming a semiconductor layer AS described later. Further, in the embodiment 1, a potential of the reflection film RL is fixed to a predetermined potential.

A background film IN1 for protecting the thin film transistor TFT is formed over the reflection film RL such that the back ground film IN1 covers the reflection film RL and the opening portion AP. The gate lines GL and the common lines CL are formed over the back ground film IN1. An insulation film GI is formed over the back ground film IN1, the gate lines GL and the common lines CL such that the insulation film GI covers the gate lines GL, the common lines CL and the like. The insulation film GI functions as a gate insulation film of the thin film transistor TFT in the region where the thin film transistor TFT is formed. A film thickness and the like of the insulation film GI are set corresponding to the function of the gate insulation film.

The semiconductor layer AS made of amorphous silicon, for example, is formed over an upper surface of the insulation film GI at a position where the semiconductor layer AS overlaps with a portion of the gate line GL. The semiconductor layer AS constitutes a semiconductor layer of the thin film transistor TFT. In forming the semiconductor layer AS, for example, an amorphous silicon layer AS' is formed below the drain signal line DL, below a connection portion JC and below an extension portion (including a pad portion PD) of a source electrode ST thus providing the constitution with a small stepped portion. A material of the semiconductor layer AS is not limited to amorphous silicon and the semiconductor layer AS may be made of low-temperature polysilicon or microcrystal silicon.

The drain line DL extending in the Y direction in the drawing has an extension portion (connection portion) JC which extends toward a thin film transistor TFT side at a portion thereof, and the extension portion JC is connected to a drain electrode DT of the thin film transistor TFT formed over the semiconductor layer AS. Further, the drain line DL is configured to intersect with the gate line GL by way of the insulation film GI and the amorphous silicon layer AS'.

The source electrode ST which is simultaneously formed with the formation of the drain line DL and the drain electrode DT faces the drain electrode DT in an opposed manner above the semiconductor layer AS, and includes an extension portion which slightly extends toward a pixel region side from above the semiconductor layer AS. The extension portion is formed such that the extension portion reaches a pad potion PD connected to the pixel electrode PX. Here, as shown in FIG. 2, the drain electrode DT is formed in a U-shaped pattern, for example, such that the drain electrode DT surrounds a distal end portion of the source electrode ST. Due to such a constitution, a channel width of the thin film transistor TFT can be increased.

The thin film transistor TFT is constituted of a transistor having the so-called inversely staggered MIS (Metal Insulator Semiconductor) structure in which the gate line GL is used for forming the gate electrode. Although the transistor having the MIS structure is driven such that the drain electrode DT and the source electrode ST are exchanged corresponding to the application of a bias, in this specification, for the sake of convenience, the electrode on a side where the electrode is connected to the drain line DL is referred to as the drain electrode DT, and an electrode on a side where the electrode is connected to the pixel electrode PX is referred to as the source electrode ST.

On a surface of the first substrate SUB1, that is, over the drain line DL and the source line SL, a protective film PAS formed of an insulation film which covers the thin film transistor TFT is formed. The protective film PAS is provided for preventing a direct contact between the thin film transistor TFT and liquid crystal, and is also provided for leveling the surface of the first substrate SUB1 which becomes necessary for forming the thin film transistor TFT. Accordingly, as described later, the protective film PAS is formed such that the protective film PAS extends over the whole liquid-crystal-side surface of the first substrate SUB1, that is, the protective film PAS reaches a peripheral portion of the liquid crystal side surface. The planar common electrode CT is formed over the protective film PAS, and a capacity insulation film CI which functions as a dielectric film of a capacity element is formed over the common electrode CT, and the pixel electrode PX is formed over the protective film PAS by way of the capacity insulation film CI. A contact hole CH which reaches the pad portion PD is formed in the capacity insulation film CI and the protective film PAS, and the pixel electrode PX and the source electrode ST of the thin film transistor TFT are electrically connected with each other via the contact hole CH.

In the pixel electrode PX of the embodiment 1, a transparent conductive film made of ITO or the like, for example, is formed in a planar shape within the region of the pixel and, thereafter, a plurality of slits SLT intersecting with the Y axis are formed in a portion corresponding to the opening portion AP which is a region allowing backlight light to pass therethrough. Due to such a constitution, linear (comb-teeth shape) electrodes which overlap with the common electrode CT are formed within the opening portion AP. Further, in the embodiment 1, the inside of the region of one pixel is divided into two regions consisting of a region close to the thin film transistor TFT and a region remote from the thin film transistor TFT. By making an angle formed by the slits SLT (inclination angle of the slits SLT with respect to the Y direction) different between two regions, the linear electrode portions within the opening portion AP have different inclination angles. Due to such a constitution, transmissivity in the region where the slits SLT are formed can be enhanced and, at the same time, viewing angle dependency is alleviated. Although the pixel electrode PX of the embodiment 1 adopts the constitution where end portions of the slits SLT are connected with each other, the present invention is not limited to such a constitution, and one end or both ends of the slit SLT may be opened.

Color filters CF of R (red), G (green), B (blue) for constituting the color-display pixels are formed on a liquid-crystal-surface side of the second substrate SUB2 which is arranged to face the first substrate SUB1 in an opposed manner with liquid crystal LC sandwiched therebetween, and a black matrix BM which constitutes a light shielding film is formed in a boundary portion between the respective color filters CF. An overcoat layer OC which constitutes a protective film is formed over the color filter CF and the black matrix BM, and an alignment film not shown in the drawing is formed over the overcoat layer OC, that is, the alignment film is formed on a liquid-crystal-side surface of the overcoat layer OC.

(Constitution of Reflection Film)

Figure 4:
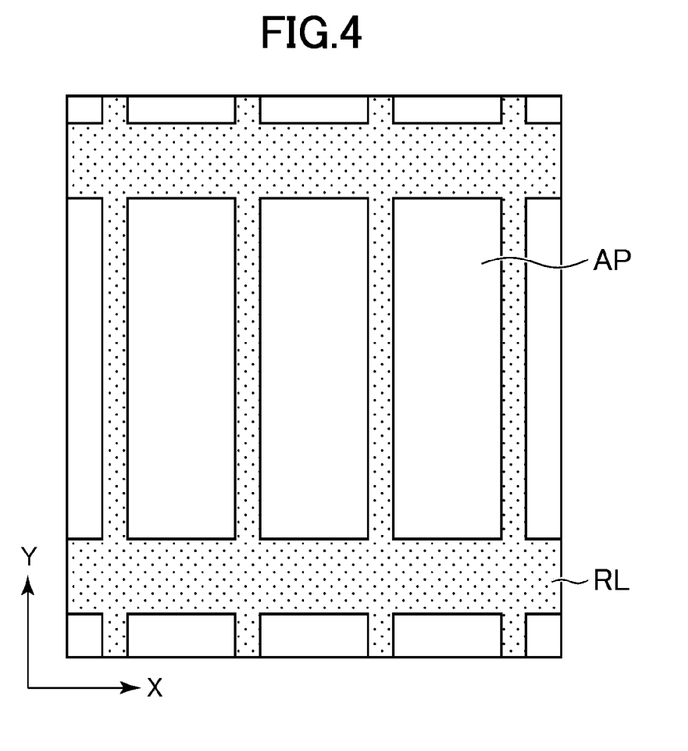
FIG. 4 is a view for explaining the positional relationship between a reflection film and an opening portion of the liquid crystal display device according to the embodiment 1 of the present invention.
Figure 5:
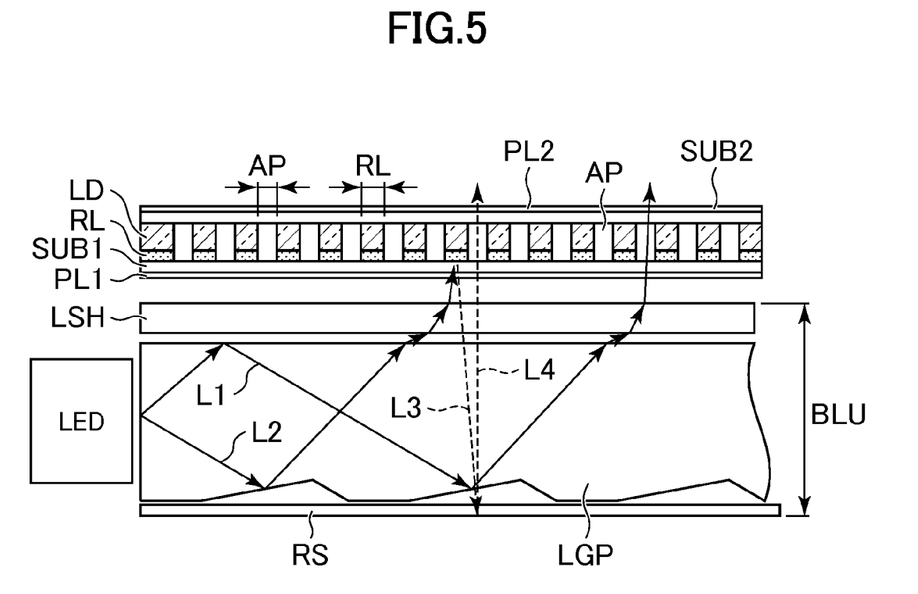
FIG. 5 is a cross-sectional view of the liquid crystal display device according to the embodiment 1 of the present invention including a backlight device.

Next, FIG. 4 is a view for explaining the positional relationship between the reflection film and the opening portion in the liquid crystal display device of the embodiment 1 according to the present invention, and FIG. 5 is a cross-sectional view of the liquid crystal display device of the embodiment 1 according to the present invention including the backlight unit. Hereinafter, the detailed constitution of the liquid crystal display device of the embodiment 1 is explained in conjunction with FIG. 4 and FIG. 5.

As shown in FIG. 4, a metal thin film is formed over the surface of the first substrate SUB1 of the liquid crystal display device of the embodiment 1, and the opening portions AP are formed in the metal thin film in a matrix array, and the reflection film RL is formed between the neighboring opening portions AP. The opening portions AP are formed in an overlapping manner with regions where the pixel electrode PX is formed and correspond to the respective pixel regions. To be more specific, in the embodiment 1, by forming the opening portions AP in the metal thin film such that, within the ITO film which forms the pixel electrode PX, the region in which the linear electrodes overlap with the common electrode CT (the region where the slits SLT are formed) and the opening portion AP overlap with each other, the regions which do not contribute to an image display constitute regions for forming the reflection film RL. According to this embodiment 1, by forming the metal thin film which constitutes the reflection film RL in the region at least within the display region AR, it is possible to make backlight light irradiated to the display region AR reflected and return to the backlight unit. When the reflection film RL is not formed in the region outside the display region AR, the backlight light which is irradiated to the region outside the display region AR is not reflected. Accordingly, for example, by adopting the whole area of the surface of the first substrate SUB1 or an irradiation range of backlight light as the region for forming the reflection layer RL, it is possible to efficiently return backlight light unrelated to an image display to the backlight unit.

In this manner, in the liquid crystal display device of the embodiment 1, firstly, the metal thin film which covers the liquid-crystal-side surface of the first substrate SUB1 is formed and, then, the opening portions AP which are arranged in a matrix array are formed in the metal thin film. By forming the reflection film RL in accordance with such steps, it is possible to form the reflection film RL in the regions where the lines such as the drain lines DL and the gate lines GL are formed and the regions where the thin film transistor TFT is formed within the display region AR.

Next, the liquid crystal display panel and the backlight unit which constitute the liquid crystal display device of the embodiment 1 are explained in conjunction with FIG. 5. In the explanation made hereinafter, a case where a side light type (edge light type) backlight unit where a light emitting diode light source (LED light source) LED is arranged on a side peripheral portion of the backlight unit is used is explained. However, the present invention is also applicable to a case where a direct backlight unit is used. The backlight light source is not limited to the LED light source and may be a cold cathode tube (CCFL) or the like. Further, the constitutional elements which are explained in the above-mentioned paragraph on "Constitution of pixel", that is, the back ground film IN1, and the gate line GL (including the gate electrode GT), the insulation film GI, the semiconductor layer AS, the amorphous silicon film AS', the drain line DL (including the drain electrode DT and the connection portion JC), the source electrode ST, the protective film PAS, the capacity insulation film CI and the alignment film not shown in the drawing and the like which are formed above the background film IN1 are abbreviated as a liquid crystal drive layer LD. The pixel electrodes PX and liquid crystal LC are omitted. Further, the color filters CF, the overcoat layer OC and the like which are formed over the second substrate SUB2 are also omitted.

As shown in FIG. 5, the liquid crystal display panel PNL of the embodiment 1 is constituted of the first substrate SUB1 and the second substrate SUB2 which are arranged to face each other in an opposed manner with liquid crystal sandwiched therebetween, the first substrate SUB1 is arranged on a backlight unit BLU side, and the second substrate SUB2 is arranged on a display screen side, that is, a viewer's side. In such a constitution, a lower polarizer PL1 is arranged on a backlight unit side surface of the first substrate SUB1, and an upper polarizer PL2 is arranged on a display screen side surface of the second substrate SUB2. Further, as described previously, in the liquid crystal display panel PNL of the embodiment 1, the reflection film RL is formed over the liquid-crystal-side surface of the first substrate SUB1, and the liquid crystal drive layer LD is formed over the reflection film RL.

On the other hand, the backlight unit BLU is provided with the light source LED along a side wall surface of a light guide plate LGP formed in a planar shape, wherein the light source LED is constituted of a plurality of light emitting diodes which are spot light sources arranged parallel to each other. Light irradiated from the light source LED is converted into a planar uniform backlight light by the light guide plate LGP, and is irradiated to an upper side in FIG. 5, that is, toward a liquid crystal display panel PNL side. On an irradiation surface side of the light guide plate LGP, a plurality of well-known optical sheets LSH including a diffusion sheet which diffuses the backlight light irradiated from the light guide plate LGP and a reflective polarization film which has a function of irradiating a larger amount of P waves of the backlight light and also has a function of irradiating the P waves after converting the S waves into the P waves are arranged. Further, a reflection sheet RS is arranged on a back surface side of the light guide plate LGP, and the reflection sheet RS returns light irradiated in the direction different from the irradiation direction of the backlight light to the light guide plate LGP again thus making use of such light as the backlight light.

In the liquid crystal display device of the embodiment 1 having such a constitution, out of light which is irradiated from the light source LED and is incident on the light guide plate LGP, light indicated by an arrow L1 in FIG. 5 is reflected within the light guide plate LGP, and is irradiated from a surface of the light guide plate LGP on a side where the liquid crystal display panel PNL is arranged (the surface which faces the liquid crystal display panel PNL in an opposed manner). The backlight light indicated by an arrow L1 which is irradiated from the light guide plate LGP passes through the optical sheet LSH and, thereafter, is incident on the lower polarizer PL1 which is formed on a back surface side of the liquid crystal display panel PNL which is a side where the liquid crystal display panel PNL faces the backlight unit BLU in an opposed manner. The backlight unit BLU of the embodiment 1 includes the reflective polarization film not shown in the drawing in the optical sheet LSH and hence, the backlight light which passes through the optical sheet LSH is incident on the lower polarizer PL1 as backlight light containing a larger amount of a P-wave component than an S-wave component. The backlight light indicated by the arrow L1 which is incident on the lower polarizer PL1 is polarized by the lower polarizer PL1, passes through the opening portion AP formed in the metal thin film which constitutes the reflection film RL and, thereafter, a polarization state of the backlight light is changed by the liquid crystal layer so that only light having a predetermined polarization component is allowed to pass through the upper polarizer PL2, and the light is irradiated from a display screen of the liquid crystal display panel PNL as light which forms an image (display light) thus performing an image display.

On the other hand, out of the light which is irradiated from the light source LED and is incident on the light guide plate LGP, light indicated by an arrow L2 in FIG. 5 is reflected in the inside of the light guide plate LGP, is irradiated from a surface of the light guide plate LGP on a side where the liquid crystal display panel PNL is arranged and, thereafter, passes through the optical sheet LSH, and is incident on the lower polarizer PL1 formed on a back surface side of the liquid crystal display panel PNL. In the same manner as the backlight light indicated by the arrow L1, this backlight light is also incident on the lower polarizer PL1 as backlight light containing a larger amount of P-wave component than an S-wave component. The backlight light indicated by the arrow L2 which is incident on the lower polarizer PL1 is polarized by the lower polarizer PL1 and, thereafter, is incident on the reflection film RL formed of the metal thin film. Since the reflection film RL is formed of a metal thin film made of Al, Ag or the like, the extremely high optical reflectance can be acquired on an interface between the first substrate SUB1 and the reflection film RL, that is, on a surface of the reflection film RL on the first substrate SUB1. As a result, the backlight light which is incident on the reflection film RL from the first substrate SUB1 side, that is, from the lower polarizer PL1 is reflected on the reflection film RL as indicated by an arrow L3 depicted by a dotted line and, thereafter, is incident on the light guide plate LGP. In the embodiment 1, the optical sheet LSH includes the reflective polarization film and hence, the backlight light containing a large amount of P-wave component is irradiated to the liquid crystal display panel PNL. Accordingly, also when the backlight light reflected on the reflection film RL is incident on the light guide plate LGP, the backlight light passes through the lower polarizer PL1. Also in this case, the backlight light becomes light (reflection light) containing a large amount of P-wave component and hence, the attenuation of backlight light by the lower polarizer PL1 can be suppressed thus preventing lowering of the light utilization efficiency.

Thereafter, the reflection light L3 which is incident on the light guide plate LGP repeats the reflection on the reflection sheet RS and/or the reflection in the inside of the light guide plate LGP, is irradiated from the irradiation surface of the light guide plate LGP again, and is irradiated to the liquid crystal display panel PNL as the backlight light containing a larger amount of P-wave component than an S-wave component by the optical sheet LSH. Then, as indicated by an arrow L4, the backlight light passes through the opening portion AP formed in the metal thin film which constitutes the reflection film RL and, thereafter, a polarization state of the backlight light is changed by the liquid crystal layer so that only light having a predetermined polarization component passes through the upper polarizer L2, and is irradiated from the display screen of the liquid crystal display panel PNL as light which forms an image whereby an image display is performed. When the light is incident on the reflection film RL again, again, as described previously (indicated by the arrow L3), the light passes through the lower polarizer PL1 and the optical sheet LSH and, thereafter, is incident on the light guide plate LGP. Due to the reflection of the light on the reflection film RL and passing of the light through the opening portion AP explained above, the light from the backlight unit can be effectively utilized and hence, the light utilization efficiency of the backlight light can be enhanced thus enhancing the brightness of the non-self-luminous display part as a result.

The liquid crystal display device of the embodiment 1 adopts the constitution where the black matrix BM is formed on the liquid crystal surface side of the second substrate SUB2 together with the color filters CF. However, the liquid crystal display device of the embodiment 1 may adopt the constitution which is not provided with the black matrix BM since the backlight light is not directly irradiated to the boundary portion between the neighboring color filters CF of different colors.

Embodiment 2

Figure 6:
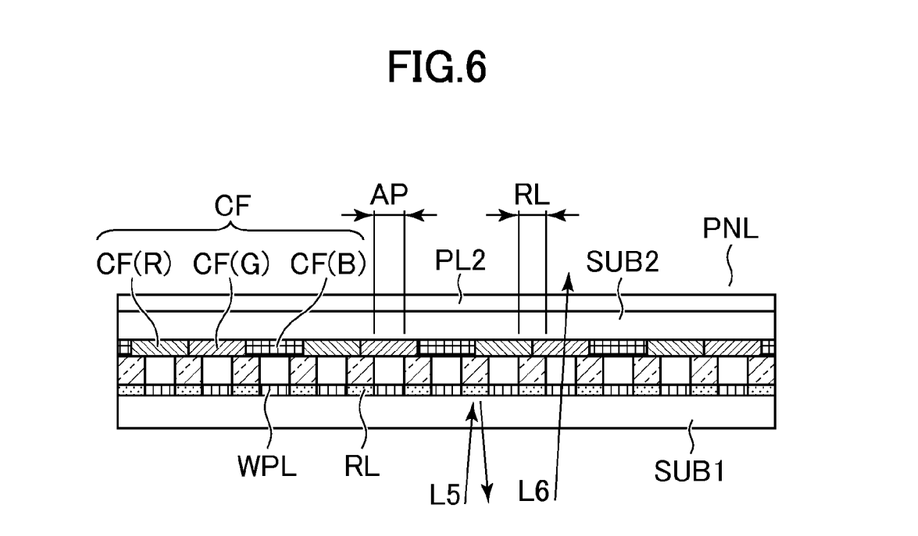
FIG. 6 is a view for explaining the schematic constitution of a liquid crystal display device according to an embodiment 2 of the present invention.

FIG. 6 is a view for explaining the schematic constitution of a liquid crystal display device of the embodiment 2 according to the present invention. The liquid crystal display device of the embodiment 2 is explained in conjunction with FIG. 6 hereinafter. The liquid crystal display device of the embodiment 2 has the substantially same constitution as the liquid crystal display device of the embodiment 1 with respect to the constitutions except for the lower polarizer and a wire grid polarizer. Accordingly, in the explanation made hereinafter, the constitution of the wire grid polarizer is explained in detail. Further, in the explanation made hereinafter, the black matrix is not provided on the boundary portion between the color filters CF of different colors formed over the second substrate SUB2. However, the black matrix may be formed in the same manner as the embodiment 1.

As shown in FIG. 6, in the liquid crystal display device of the embodiment 2, the reflection film RL is formed of a metal thin film made of Ag, Al or the like or an alloy containing Ag or Al. Wire grid polarizers WPL are arranged in regions corresponding to the above-mentioned opening portions AP of the reflection film RL. That is, in the liquid crystal display device of the embodiment 2, the wire grid polarizers WPL are formed in a matrix array over the metal thin film formed over the surface of the first substrate SUB1, and the reflection film RL is formed between the neighboring wire grid polarizers WPL. The wire grid polarizer WPL has a function of allowing a P-wave component to pass therethrough and a function of reflecting or absorbing an S-wave component and hence, it is unnecessary to use the reflective polarization film for increasing a P-wave component than an S-wave component as the optical sheet LSH whereby the number of optical sheets to be used can be reduced. The wire grid polarizers WPL may be formed by inprint printing, for example. That is, a plurality of columnar bodies each of which has a predetermined thickness and is made of a non-transmitting thin film material are formed at predetermined intervals. In place of the wire grid polarizers WPL, usual polarizers may be formed in these regions. In this case, a reflective polarization film or the like may be used as the optical sheet LSH.

As a result, when backlight light which passes through an optical sheet not shown in the drawing is incident on the liquid crystal display panel PNL in the direction indicated by an arrow L5 from a lower side in FIG. 6 which is a backlight-side surface of the liquid crystal display panel PNL of the embodiment 2, the backlight light is reflected on the reflection film RL, passes through the optical sheet and, thereafter, is returned to the light guide plate and, in the same manner as the embodiment 1, the light is irradiated as the backlight light again.

On the other hand, when the backlight light is incident on the liquid crystal display panel PNL of the embodiment 2 as indicated by an arrow L6, the backlight light is polarized by the wire grid polarizer WPL and, thereafter, a polarization state of the backlight light is changed by the liquid crystal layer so that only light having a predetermined polarization component passes through the upper polarizer PL2, and the light is irradiated from the display screen of the liquid crystal display panel PNL as light (display light) which forms an image thus performing an image display.

In this manner, according to the liquid crystal display device of the embodiment 2, the wire grid polarizers WPL are formed in regions where the reflection film RL is not formed. Accordingly, in addition to the above-mentioned advantageous effects of the embodiment 1, it is unnecessary to arrange the polarizer on the backlight-unit-side surface of the liquid crystal display panel PNL and hence, it is possible to acquire a particularly advantageous effect that a thickness of the liquid crystal display device can be further decreased. Further, the liquid crystal display device of the embodiment 2 is not provided with the lower polarizer and hence, the backlight light which is irradiated from the backlight unit BLU and is reflected on the reflection film RL can be directly returned to the backlight unit BLU and hence, the loss of reflection light can be further decreased. As a result, it is also possible to acquire a particularly advantageous effect that the light utilization efficiency of the backlight light can be further enhanced.

In the liquid crystal display devices of the embodiments 1, 2, the reflection film RL is formed using Ag, Al or the like or an alloy containing Ag or Al. However, the present invention is not limited to such a constitution, and the reflection film RL may be formed of a thin film made of other metal or the like which can form a reflection film RL having reflectance substantially equal to reflectance of the above-mentioned thin film.

In the liquid crystal display devices of the embodiments 1, 2, the backlight light is not directly incident on the regions except for the regions of the reflection film RL where the opening portions AP are formed and hence, the liquid crystal display devices can acquire a particularly advantageous effect that a leak current which is caused due to the incidence of the backlight light on the thin film transistor TFT can be largely reduced.

In the liquid crystal display devices of the embodiments 1, 2, the reflective polarization film is used as the optical sheet LSH. However, the liquid crystal display devices may adopt the constitution where the reflective polarization film is not used.

In the liquid crystal display devices of the embodiments 1, 2, a shape of the opening portion AP and a shape of the wire grid polarizer WPL are formed into a rectangular shape in conformity with a shape of the pixel. However, the present invention is not limited to such a constitution, and the shape of the opening portion AP and the shape of the wire grid polarizer WPL may be suitably changed corresponding to a shape of the pad portion PD which connects the pixel electrode and the thin film transistor TFT, a shape of the pixel electrode PX and the like.

Further, in the liquid crystal display devices of the embodiments 1, 2, the reflection film RL is directly formed over the surface of the first substrate SUB1. However, the present invention is not limited to such a constitution, and a silicon oxide (SiO) based back ground film or a silicon nitride (SiN) based back ground film may be provided between the first substrate SUB1 and the reflection film RL.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
   a pair of transparent substrates which are arranged to face each other in an opposed manner with a liquid crystal layer sandwiched therebetween;
   a non-self-luminous display part having at least light transmitting regions which allow light to pass therethrough and a light shielding region which shields light; and
   a backlight part which irradiates backlight light from a back surface side of the non-self-luminous display part; wherein
   the pair of transparent substrates comprises a first substrate which is arranged on a backlight part side and a second substrate which faces the first substrate,
   the first substrate includes a reflection film formed of a metal thin film, the reflection film being formed on a liquid crystal layer side of the first substrate,
   opening regions corresponding to the light transmitting regions are formed in the reflection film,
   the backlight light which is incident on the opening region passes through the opening region and reaches the liquid crystal layer side, and the backlight light which is incident on a region where the reflection film is formed is reflected toward the backlight part side, and
   the first substrate has polarization members for reflecting or absorbing an S-wave component of the backlight light and for allowing the transmission of a P-wave component therethrough in the opening regions, the polarization members being respectively arranged inside of the opening regions so as not to overlap the reflection film.

2. The liquid crystal display device according to claim 1, wherein the opening regions where the polarizer members are formed and the region where the reflection film is formed are formed alternately and adjacent to each other.

3. The liquid crystal display device according to claim 1, wherein the polarization members include a plurality of columnar bodies which are formed using a non-transmitting thin film material and have a predetermined thickness, and the columnar bodies are formed at predetermined intervals by in-print printing.

4. The liquid crystal display device according to claim 1, wherein at least one of a silicon-oxide based protective film and a silicon-nitride based protective film is provided between the first substrate and the reflection film.

5. The liquid crystal display device according to claim 1, wherein the reflection film is fixed to a predetermined potential.

6. The liquid crystal display device according to claim 1, wherein the reflection film is directly formed over a liquid-crystal-layer-side surface of the first substrate.

7. The liquid crystal display device according to claim 1, wherein the first substrate includes a plurality of drain lines and a plurality of gate lines intersecting the drain lines and define regions surrounded by the drain lines and the gate lines as regions of pixels, and the second substrate has color filters of red, green and blue corresponding to regions of the pixels formed thereon.

8. The liquid crystal display device according to claim 1, wherein the first substrate has wire grid polarization members in the opening regions, and
the wire grid polarizers have a polarization function.

* * * * *